United States Patent
Shao et al.

(10) Patent No.: US 10,592,814 B2
(45) Date of Patent: Mar. 17, 2020

(54) AUTOMATIC DESIGN FLOW FROM SCHEMATIC TO LAYOUT FOR SUPERCONDUCTING MULTI-QUBIT SYSTEMS

(71) Applicant: INTERNATIONAL BUSINESS MACHINES CORPORATION, Armonk, NY (US)

(72) Inventors: Dongbing Shao, Wappingers Falls, NY (US); Markus Brink, White Plains, NY (US); Salvatore B. Olivadese, Stamford, CT (US); Jerry M. Chow, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/828,613

(22) Filed: Dec. 1, 2017

(65) Prior Publication Data

US 2019/0171973 A1 Jun. 6, 2019

(51) Int. Cl.
| | |
|---|---|
| *G06F 17/50* | (2006.01) |
| *G06N 10/00* | (2019.01) |
| *H01L 39/02* | (2006.01) |
| *H01L 39/24* | (2006.01) |
| *H01L 39/22* | (2006.01) |
| *H01L 27/18* | (2006.01) |

(52) U.S. Cl.
CPC ......... *G06N 10/00* (2019.01); *G06F 17/5045* (2013.01); *G06F 17/5072* (2013.01); *H01L 39/025* (2013.01); *H01L 39/2493* (2013.01); H01L 27/18 (2013.01); H01L 39/223 (2013.01)

(58) Field of Classification Search
CPC . G06N 10/00; G06F 17/5022; G06F 17/5036; G06F 17/5045; G06F 17/5068; G06F 17/5072; G06F 17/5081; H03K 19/195
USPC .......................................... 716/110–111, 118
See application file for complete search history.

(56) References Cited

U.S. PATENT DOCUMENTS

| | | |
|---|---|---|
| 6,732,340 B1 | 5/2004 | Akashi |
| 8,185,856 B2 | 5/2012 | Izuha |

(Continued)

FOREIGN PATENT DOCUMENTS

| | | |
|---|---|---|
| WO | 2016081788 A1 | 5/2016 |
| WO | 2017053986 A1 | 3/2017 |

OTHER PUBLICATIONS

IBM: List of IBM Patents or Patent Applications Treated As Related (Appendix P), Mar. 14, 2018, 2 pages.

(Continued)

*Primary Examiner* — Paul Dinh
(74) *Attorney, Agent, or Firm* — Teddi E. Maranzano

(57) ABSTRACT

Generating a layout for a multi-qubit chip is provided. A schematic is received as input. The schematic input includes a plurality of qubits, a plurality of coupling busses, a bus design parameter specifying a bus frequency, a plurality of readout busses, and a plurality of readout ports. A qubit design is selected from a qubit library, based on the qubit style in the schematic input. A bus style is selected from a bus information library, based on the bus style in the schematic input. A qubit layout is automatically generated by assembling the selected bus style/, selected qubit design, the plurality of readout busses and the plurality of readout ports.

20 Claims, 5 Drawing Sheets

(56) References Cited

U.S. PATENT DOCUMENTS

| | | |
|---|---|---|
| 8,381,160 B2 | 2/2013 | Izuha |
| 8,930,869 B2 | 1/2015 | Ohtsuka et al. |
| 9,344,092 B2 | 5/2016 | Abraham et al. |
| 9,361,424 B2 | 6/2016 | Robles |
| 9,652,571 B2 | 5/2017 | Shauck et al. |
| 2006/0123363 A1 | 6/2006 | Williams et al. |
| 2009/0014714 A1 | 1/2009 | Koch |
| 2011/0057169 A1 | 3/2011 | Harris et al. |
| 2014/0026107 A1* | 1/2014 | Bocharov ............ G06F 17/5045 716/101 |
| 2014/0157214 A1* | 6/2014 | Ahn ....................... B82Y 10/00 716/102 |
| 2014/0264284 A1* | 9/2014 | Abraham ............... B82Y 10/00 257/31 |
| 2016/0364653 A1* | 12/2016 | Chow ..................... H01L 25/04 |
| 2017/0017742 A1 | 1/2017 | Oberg et al. |
| 2017/0193388 A1 | 7/2017 | Flipp et al. |
| 2017/0228483 A1* | 8/2017 | Rigetti ..................... G06N 7/00 |

OTHER PUBLICATIONS

Pending U.S. Appl. No. 15/828,623, filed Dec. 1, 2017, entitled: "Superconducting Quantum Circuits Layout Design Verification", 25 pages.

* cited by examiner

AUTOMATIC DESIGN FLOW FROM SCHEMATIC TO LAYOUT FOR SUPERCONDUCTING MULTI-QUBIT SYSTEMS

BACKGROUND

The present invention relates to fabrication of quantum computing devices, and more specifically, to automatic design layout for multi-qubit systems.

In quantum computing, a qubit or quantum bit is a unit of quantum information, the quantum analogue of the classical bit. A qubit is a two-state quantum-mechanical system, such as the polarization of a single photon: here the two states are vertical polarization and horizontal polarization. In a classical system, a bit would have to be in one state or the other. However, quantum mechanics allows the qubit to be in a superposition of both states at the same time, a property that is fundamental to quantum computing. Several implementations of quantum computers are based on superconducting circuits. These types of implementations typically contains Josephson Junctions. The properties of the Josephson Junction can have significant effect on the performance of the circuits.

BRIEF SUMMARY

Embodiments of the invention may provide a method, system, and computer program product for generating a layout for a multi-qubit chip. The method, system, and computer program product may include receiving a schematic input. The schematic input includes a bus design parameter specifying a bus frequency, a plurality of qubits, a plurality of coupling busses, a plurality of readout busses, and a plurality of readout ports. Also provided is selecting a qubit design from a qubit library, based on the qubit style in the schematic input. Further provided is selecting a bus style from a bus information library, based on the bus style in the schematic input. Further provided is automatically generating the plurality of coupling busses and the plurality of readout busses, based on the specified bus frequency and selected bus style. Further provided is automatically generating a qubit layout by assembling the selected bus style, selected qubit design, the plurality of readout busses and the plurality of readout ports.

DETAILED DESCRIPTION

Figure 1:
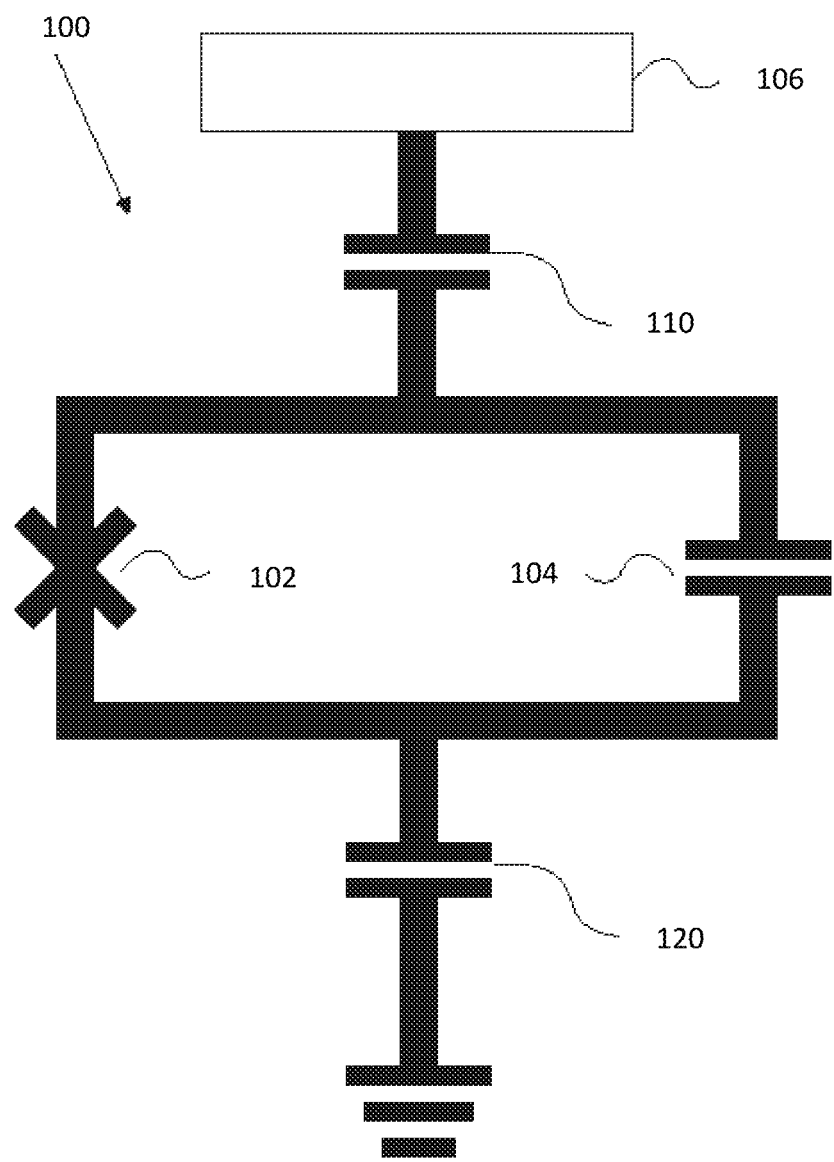
FIG. 1 illustrates an example qubit circuit diagram, in accordance with embodiments of the present disclosure.

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will convey the scope of this disclosure to those skilled in the art. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Multi-qubit chips are necessary in creating quantum computing systems. However, each qubit added to a chip also adds to the design complexity of the chip, as a qubit may interact with other proximal qubits when their resonance frequency is similar. Such behavior constitutes a failure mode known as a 'frequency collision.' Frequency collisions can be reduced by attention to placement of the qubits. In current practice, microwave resonators, i.e., the coupling busses and readout resonators, occupy a large portion of the multi-qubit layout. Additionally, the resonators are manually drawn by a layout engineer in an effort to eliminate frequency collisions prior to submitting the layout for verification. This manual process is both time consuming and error prone, often requiring re-work. Further, the amount of time currently required to manually draw a layout having 10-16 qubits hinders experimentation in design layouts having a greater number of qubits. To continue the growth in qubit density on design layouts, it is desirable to automate design flow such that a design layout generation can be measured in hours rather than in weeks.

FIG. 1 illustrates an example qubit 100, in accordance with embodiments of the present disclosure. In some embodiments, the qubit 100 contains a Josephson Junction 102, and a capacitor 104 connected in parallel with one another as shown in FIG. 1. The parallel Josephson Junction 102 and capacitor 104 arrangement is capacitively coupled by a coupling capacitor 110 to structure 106, as well as capacitively coupled by a coupling capacitor 120 to ground. While only a single structure is shown capacitively coupled to the Josephson Junction 102 and capacitor 104, multiple structures may be attached to the parallel Josephson Junction 102 and capacitor 104 arrangement depicted. For example, a readout structure and interconnects to other qubit structure may each be capacitively connected to the parallel Josephson Junction 102 and capacitor 104 arrangement. Additionally, while qubit 100 is depicted as using coupling capacitor 110 and coupling capacitor 120, other methods of electrically connecting the qubit may be used.

Figure 2:
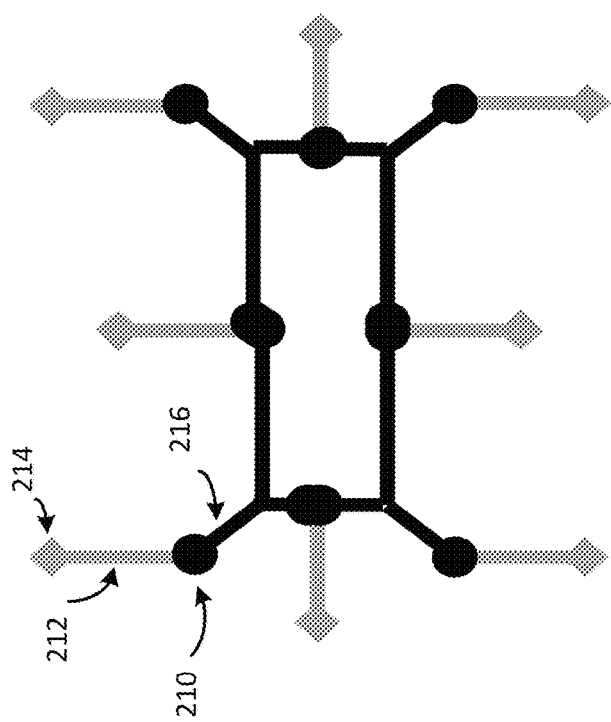
FIG. 2 illustrates an example qubit schematic, in accordance with embodiments of the present disclosure.

FIG. 2 illustrates an example schematic having multiple capacitively coupled qubits as depicted in FIG. 1, in accordance with embodiments of the present disclosure. Each qubit 210 is connected to one or more qubits 210 by a coupling bus 216. The readout bus 212 is connected to a readout port 214 through which the signal can be read.

Figure 3:
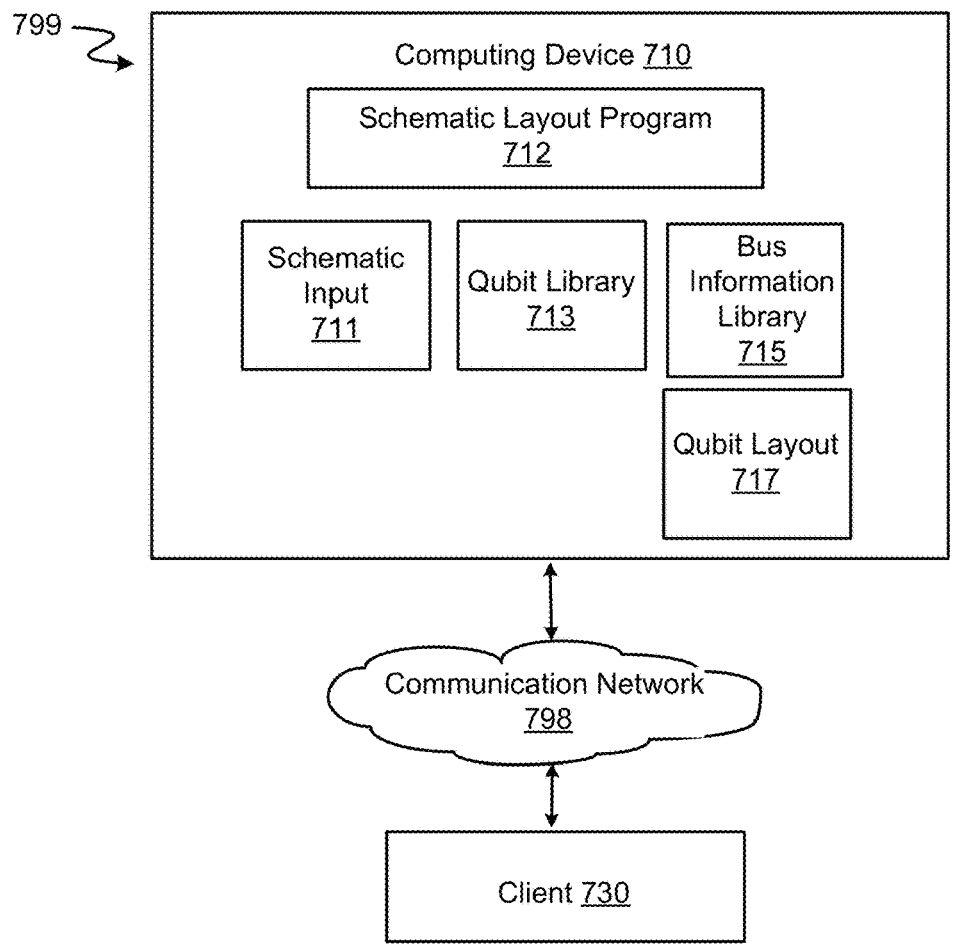
FIG. 3 illustrates a qubit schematic layout system, in accordance with embodiments of the invention.

FIG. 3 illustrates a qubit schematic layout system, in accordance with embodiments of the invention. In an example embodiment, qubit schematic layout system 799 includes computing device 710 and client 730 interconnected via a communication network 798.

Network 798 may include, for example, wired, wireless or fiber optic connections. In an embodiment, network 798 may be implemented as an intranet, a local area network (LAN), or a wide area network (WAN). In general, network 798 can be any combination of connections and protocols that will support communications between the computing device 710 and the client 730.

Computing device 710 includes schematic layout program 712, qubit library 713, bus information library 715, and the qubit layout output 717. In the example embodiment, computing device 710 may include a desktop computer, a notebook or a laptop computer or any other electronic device or computing system capable of communicating with the client 730 via network 798, and performing the computations necessary to operate the schematic layout program 712. While computing device 710 is depicted as a single device, the programs located on the computing device 710 may be located on separate devices communicating with each other, or additionally a program may be operated on a plurality of computing devices, such as client 730. Computing device 710 and client 730 are described in more detail with reference to FIG. 5.

The computing device 710 includes input libraries, each library containing templates for components that can be manually selected, based on the input schematic, and input to the schematic layout program 712 for assembly into the desired qubit layout 717. For example, the qubit library 713 includes standard qubit design styles. A qubit design may specify, for example, how many Josephson Junctions on the particular qubit. The bus information library 715 includes styles and frequency information for a variety of possible bus designs. For example, a bus may connect to two qubits one on each end of the bus, or multiple qubits may be connected by the same bus. The bus information library 715 can include various bus frequencies, such as quarter wave, or half wave. The selected entries from the bus information library 715, particularly the bus frequency are used for the schematic layout program 712 to estimate the area needed for the layout. In particular, the bus length is derived based on the desired resonance frequency.

Schematic layout program 712 receives schematic input 711 and can issue instructions to read the schematic input 711 to discover and identify the characteristics required in the generated qubit layout 717. In an embodiment, the qubit design can be manually selected from a displayed list of possible qubit designs in the qubit library 713. Similarly, the coupling bus style can be manually selected from a displayed list of possible bus designs in the bus information library 715. Using the same bus style, the schematic layout program 712 can generate different busses, using an input bus design parameter for bus frequency. In another embodiment, schematic layout program 712 can issue instructions to extract components having the identified characteristics from the qubit library 713 and bus information library 715. In either embodiment, the schematic layout program 712 can issue instructions to assemble the extracted components into the qubit layout 717. Schematic layout program 712 can issue instructions to generate an initial floor plan (i.e., initial qubit and bus placements) that can be visually inspected and manually adjusted prior to generating the qubit layout 717. The operations and functions of schematic layout program 712 are described in further detail below with regard to FIG. 4.

Figure 4:
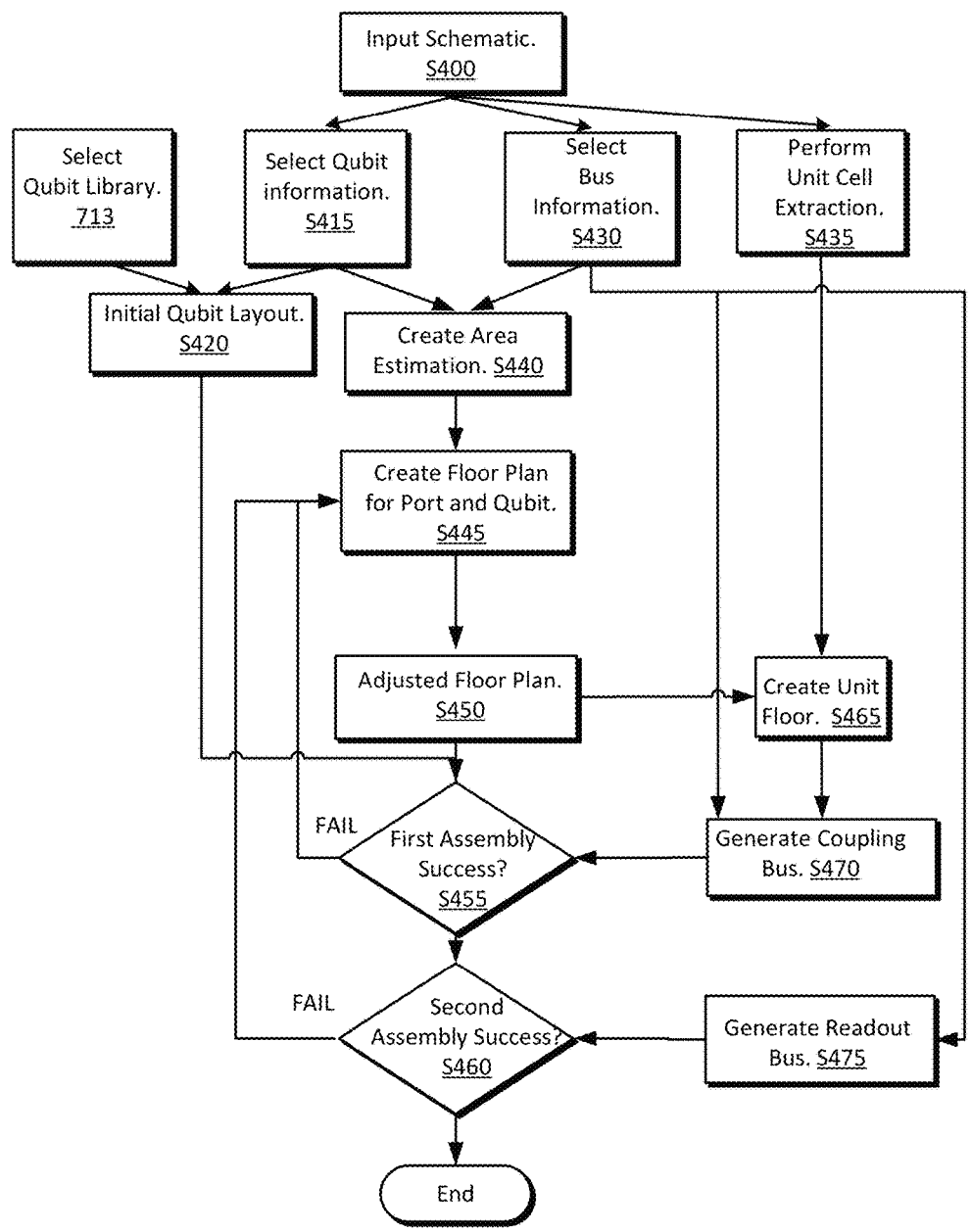
FIG. 4 is a flowchart illustrating the operations of the qubit schematic layout system of FIG. 3, in accordance with embodiments of the invention.

FIG. 4 is a flowchart illustrating the operations of the qubit schematic layout system of FIG. 3, in accordance with embodiments of the invention.

Referring to step S400, a schematic for a multi-qubit layout is received as input. The schematic layout program 712 can generate the schematic for the multi-qubit layout. In an embodiment, the input schematic is output from another electronic design automation (EDA) tool.

At S415, the qubit style identified in the input schematic is selected from the qubit library 713, and placed on the chip, creating the initial qubit layout (S420).

Similarly, at S430 the bus having the required bus style and frequency is selected from the bus information library 715 and placed on the chip (S420). The selected qubit style and bus style/frequency can indicate the number of required connections. The bus resonance frequency is used to derive the bus length. However, to accommodate the multiple busses within the chip floor plan, each bus meanders between connection points in a serpentine shape in order to fit into the available chip area. Additional turns are added to the meander to achieve the required bus length, with each turn consisting of a 90 degree curved elbow.

The area required for the floor plan is estimated based on the total of the area required for each qubit and each bus (S440). Each qubit additionally includes a readout bus 212 leading off the chip, and a readout port 214 through which the signal can be read. The total area for the floor plan is then calculated by adding total of the area required for each qubit and each bus together with the area required for each readout bus 212 and readout port 214 (S445). The schematic layout program 712 (S445) then creates the floor plan, with all the qubits roughly placed in the middle and the readout ports placed at the boundary.

Unit cell extraction (S435) can be performed to recognize and extract repeating patterns of qubits and connections. These extracted unit cells (S465) can be replicated, rotated, and mirrored, for example, to create the floor plan for the whole chip.

At S450, the floor plan created at S445 can be adjusted by the schematic layout program 712, or by manual intervention, to change the layout or spacing. At S470, the actual meander of the coupling busses is generated. Each bus is generated to fit within the area estimated for it in S440.

At S455 the first assembly of generated coupling busses with qubits is performed. A failure is detected when there is not enough room to place the bus having the required length based on the required bus resonance frequency. If the first assembly fails (S455) the floor plan is adjusted and the first assembly is re-tried by adjusting the location of qubits according to the area needed. The adjusting includes automatically altering the placement of one or more qubits and/or other coupling busses, as necessary, to provide the required length for the coupling bus identified as being the error.

When the first assembly succeeds, the second assembly is performed (S460). In the second assembly, the readout busses are generated and added around the output of the first assembly. As in the first assembly, failure is detected when there is not enough room to place the readout bus in the desired location. The floor plan is automatically adjusted, which includes altering the placement of qubits, coupling busses, and other readout busses, as necessary to provide the required area for the readout bus identified as being in error.

Adjustment in the second assembly may or may not trigger re-execution of the first assembly (S455). Re-execution of the first assembly may be triggered if modifications as a result of the second assembly introduced errors in the assembly of the qubits with the generated coupling busses. However, the output of the first assembly is in the middle of the floor plan while the second assembly output is around the boundary. Therefore, the second assembly is not likely to trigger re-execution of the first assembly. In an embodiment, an error or warning may also be identified if the floor plan leaves unused a configurable percentage of space on the chip. This can be an indicator that space is being wasted.

When the first and second assemblies succeed, the generated qubit layout 717 is saved on computing device 710. The qubit layout 717 can be input to the verification process and ultimately, to fabrication.

Figure 5:
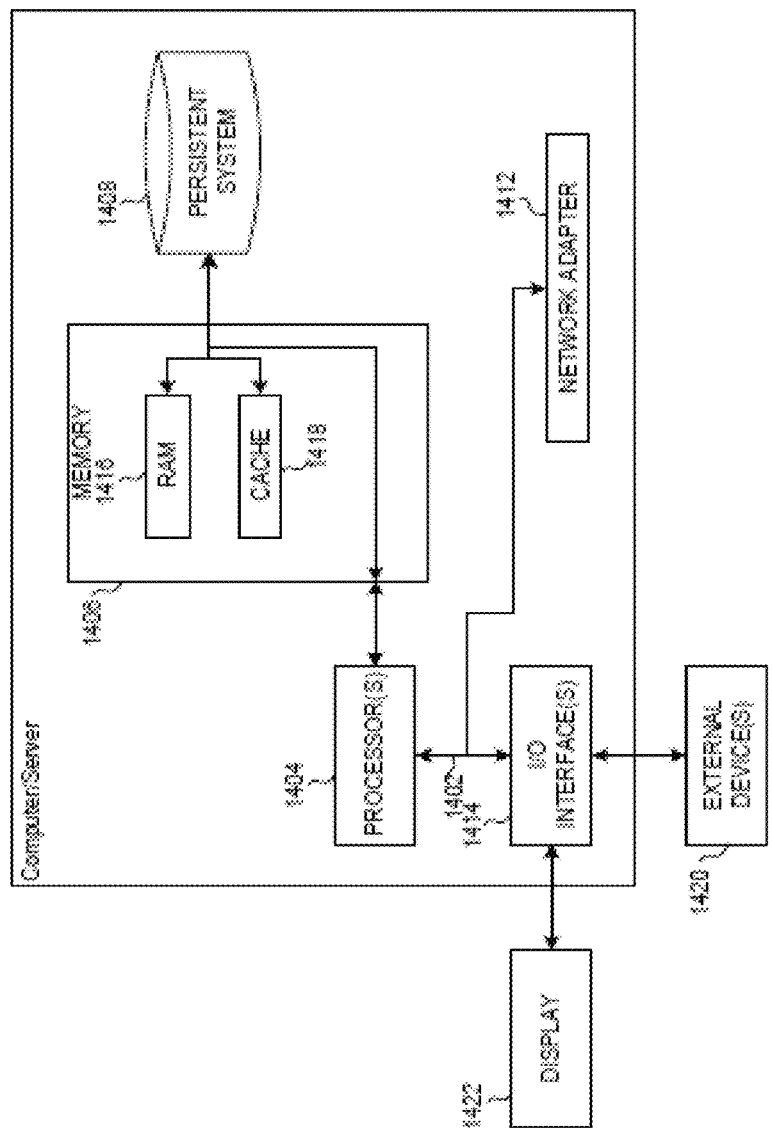
FIG. 5 is a block diagram depicting the hardware components of the qubit schematic layout system of FIG. 3, in accordance with embodiments of the invention.

FIG. 5 depicts a block diagram of components of computing device 710 and client 730, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 710 and client 730 include communications fabric 1402, which provides communications between computer processor(s) 1404, memory 1406, persistent storage 1408, communications unit 1412, and input/output (I/O) interface(s) 1414. Communications fabric 1402 can be implemented with any architecture designed for passing data and/or control information between processors (such as microprocessors, communications and network processors, etc.), system memory, peripheral devices, and any other hardware components within a system. For example, communications fabric 1402 can be implemented with one or more buses.

Memory 1406 and persistent storage 1408 are computer-readable storage media. In this embodiment, memory 1406 includes random access memory (RAM) 1416 and cache memory 1418. In general, memory 1406 can include any suitable volatile or non-volatile computer-readable storage media.

The schematic layout program 712, qubit library 713, schematic input 711, bus information library 715, and qubit layout 717 in computing device 710 are stored in persistent storage 1408 for execution by one or more of the respective computer processors 1404 via one or more memories of memory 1406. In this embodiment, persistent storage 1408 includes a magnetic hard disk drive. Alternatively, or in addition to a magnetic hard disk drive, persistent storage 1408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 1408 may also be removable. For example, a removable hard drive may be used for persistent storage 1408. Other examples include optical and magnetic disks, thumb drives, and smart cards that are inserted into a drive for transfer onto another computer-readable storage medium that is also part of persistent storage 1408.

Communications unit 1412, in these examples, provides for communications with other data processing systems or devices. In these examples, communications unit 1412 includes one or more network interface cards. Communications unit 1412 may provide communications through the use of either or both physical and wireless communications links. The schematic layout program 712, qubit library 713, schematic input 711, bus information library 715, and qubit layout 717 in computing device 710 may be downloaded to persistent storage 1408 through communications unit 1412.

I/O interface(s) 1414 allows for input and output of data with other devices that may be connected to computing device 710. For example, I/O interface 1414 may provide a connection to external devices 1420 such as a keyboard, keypad, a touch screen, and/or some other suitable input device. External devices 1420 can also include portable computer-readable storage media such as, for example, thumb drives, portable optical or magnetic disks, and memory cards. Software and data used to practice embodiments of the present invention, e.g., the schematic layout program 712, qubit library 713, schematic input 711, bus information library 715, and qubit layout 717 in computing device 710 can be stored on such portable computer-readable storage media and can be loaded onto persistent storage 1408 via I/O interface(s) 1414. I/O interface(s) 1414 can also connect to a display 1422.

Display 1422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

What is claimed is:

1. A method of generating a layout for a multi-qubit chip, the method comprising:
receiving, by a computer, a schematic input, wherein the schematic input includes a plurality of qubits, a plurality of coupling busses, a plurality of readout busses, and a plurality of readout ports;
selecting, by the computer, a qubit design from a qubit library, based on a qubit style in the schematic input;
selecting, by the computer, a coupling bus style from a bus information library, based on a bus design parameter that specifies a bus frequency;
generating, by the computer, a coupling bus length, based on the specified coupling bus frequency; and
generating, by the computer, an initial floor plan qubit layout by assembling the selected coupling bus style, selected qubit design, and the plurality of readout busses and the plurality of readout ports from the input schematic.

2. The method of claim 1, further comprising:
performing a first assembly from the selected qubit design and the selected coupling bus style, wherein a coupling bus is generated from the selected bus style and specified bus frequency, the coupling bus connects two or more qubits, and the coupling bus has a length based on the selected bus style and the specified bus frequency; and
saving an output of the first assembly.

3. The method of claim 2, further comprising:
recognizing a failure when the generated coupling bus is longer than space available for placement; and
automatically adjusting the first assembly, wherein the adjusting includes altering a placement of one or more qubits and/or other generated coupling busses until the generated coupling bus fits in the space available for placement.

4. The method of claim 1, further comprising:
performing a second assembly, wherein the plurality of readout busses, and the plurality of readout ports are generated and added to an output of a first assembly; and
saving an output of the second assembly.

5. The method of claim 4, further comprising:
recognizing a failure when one or more of the generated readout busses is longer than space available for placement; and
automatically adjusting the second assembly, wherein the adjusting includes altering a placement of one or more qubits, one or more generated coupling busses, and one or more other generated readout busses until the generated readout bus fits in the space available for placement.

6. The method of claim 1, further comprising:
recognizing and extracting repeating patterns of qubits and connections to the qubits, wherein the extracted repeating patterns are rotated, mirrored, and replicated to create a multi-qubit chip floor plan.

7. The method of claim 1, further comprising:
combining an output of a first assembly and an output of a second assembly as the generated qubit layout.

8. A system for generating a layout for a multi-qubit chip, the system comprising:
a computer processor, a computer-readable storage medium, and program instructions stored on the computer-readable storage medium being executable by the processor, to cause the computer system to perform a method, comprising:
receiving, by a computer, a schematic input, wherein the schematic input includes a plurality of qubits, a plurality of coupling busses, a plurality of readout busses, and a plurality of readout ports;
selecting, by the computer, a qubit design from a qubit library, based on a qubit style in the schematic input;
selecting, by the computer, a coupling bus style from a bus information library, based on a bus design parameter that specifies a coupling bus frequency;
generating, by the computer, a coupling bus length, based on the specified coupling bus frequency; and
generating, by the schematic layout program, an initial floor plan qubit layout by assembling the selected coupling bus style, selected qubit design, and the plurality of readout busses and the plurality of readout ports from the input schematic.

9. The system of claim 8, further comprising:
performing a first assembly from the selected qubit design and the selected bus style, wherein a coupling bus is generated from the selected bus style and the specified bus frequency, the coupling bus connects two or more qubits, and the coupling bus has a length based on the selected bus style and the specified bus frequency; and
saving an output of the first assembly.

10. The system of claim 9, further comprising:
recognizing a failure when the generated coupling bus is longer than space available for placement; and
automatically adjusting the first assembly, wherein the adjusting includes altering a placement of one or more qubits and/or other generated coupling busses until the generated coupling bus fits in the space available for placement.

11. The system of claim 8, further comprising
performing a second assembly, wherein the plurality of readout busses, and the plurality of readout ports are generated and added to an output of a first assembly; and
saving an output of the second assembly.

12. The system of claim 11, further comprising:
recognizing a failure when one or more of the the generated readout busses is longer than space available for placement; and
automatically adjusting the second assembly, wherein the adjusting includes altering a placement of one or more qubits, one or more generated coupling busses, and one or more other generated readout busses until the generated readout bus fits in the space available for placement.

13. The system of claim 11, further comprising:
combining an output of a first assembly and an output of a second assembly as the generated qubit layout.

14. A computer program product for generating a layout for a multi-qubit chip, the computer program product comprising a computer readable tangible storage medium having program instructions embodied therewith, the program instructions executable by a computer to cause the computer to perform a method, comprising:
    receiving, by a computer, a schematic input, wherein the schematic input includes a plurality of qubits, a plurality of coupling busses, a plurality of readout busses, and a plurality of readout ports;
    selecting, by the computer, a qubit design from a qubit library, based on a qubit style in the schematic input;
    selecting, by the computer, a coupling bus style from a bus information library, based on a bus design parameter that specifies the coupling bus frequency;
    generating, by the computer, a coupling bus length, based on the specified coupling bus frequency; and
    generating, by the computer, an initial floor plan qubit layout by assembling the selected coupling bus style, selected qubit design, and the plurality of readout busses and the plurality of readout ports from the input schematic.

15. The computer program product of claim 14, further comprising:
    performing a first assembly from the selected qubit design and the selected bus style/frequency, wherein a coupling bus is generated from the selected bus style/frequency, the coupling bus connects two or more qubits, and the coupling bus has a length based on the selected bus style/frequency; and
    saving an output of the first assembly.

16. The computer program product of claim 15, further comprising:
    recognizing a failure when the generated coupling bus is longer than space available for placement; and
    automatically adjusting the first assembly, wherein the adjusting includes altering a placement of one or more qubits and/or other generated coupling busses until the generated coupling bus fits in the space available for placement.

17. The computer program product of claim 14 further comprising:
    performing a second assembly, wherein the plurality of readout busses, and the plurality of readout ports are generated and added to an output of a first assembly; and
    saving an output of the second assembly.

18. The computer program product of claim 17, further comprising:
    recognizing a failure when one or more of the generated readout busses is longer than space available for placement; and
    automatically adjusting the second assembly, wherein the adjusting includes altering a placement of one or more qubits, one or more generated coupling busses, and one or more other generated readout busses until the generated readout bus fits in the space available for placement.

19. The computer program product of claim 14, further comprising:
    recognizing and extracting repeating patterns of qubits and connections to the qubits, wherein the extracted repeating patterns are rotated, mirrored, and replicated to create a multi-qubit chip floor plan.

20. The computer program product of claim 14, further comprising:
    combining an output of a first assembly and an output of a second assembly as the generated qubit layout.

* * * * *